United States Patent
Van Abel et al.

(10) Patent No.: US 12,540,371 B2
(45) Date of Patent: Feb. 3, 2026

(54) PHASE CHANGE SYSTEM AND PHASE CHANGE CRUCIBLE FOR THE SEPARATION OF RARE EARTH ELEMENTS

(71) Applicant: SHINE Technologies, LLC, Janesville, WI (US)

(72) Inventors: Eric Van Abel, Lino Lakes, MN (US); Tim Vaughan, Madison, WI (US); Charles Shackett, Madison, WI (US); Zach Childs, Madison, WI (US); Shawn Underhill, Beloit, WI (US); Matthew Szymski, Monona, WI (US); Kenny Kearney, Verona, WI (US)

(73) Assignee: SHINE Technologies, LLC, Janesville, WI (US)

( * ) Notice: Subject to any disclaimer, the term of this patent is extended or adjusted under 35 U.S.C. 154(b) by 661 days.

(21) Appl. No.: 17/873,898

(22) Filed: Jul. 26, 2022

(65) Prior Publication Data
US 2024/0035118 A1     Feb. 1, 2024

(51) Int. Cl.
*C22B 59/00*     (2006.01)
*B01D 1/00*     (2006.01)

(52) U.S. Cl.
CPC ............ *C22B 59/00* (2013.01); *B01D 1/0023* (2013.01)

(58) Field of Classification Search
CPC ......... C22B 59/00; C22B 9/02; B01D 1/0023; B01D 7/00
See application file for complete search history.

(56) References Cited

U.S. PATENT DOCUMENTS

| | | |
|---|---|---|
| 5,080,870 A | 1/1992 | Streetman et al. |
| 7,056,383 B2 | 6/2006 | Helava et al. |
| 7,244,403 B1 | 7/2007 | Maloney et al. |
| 8,137,470 B2 | 3/2012 | Min et al. |
| 8,222,650 B2 | 7/2012 | Schowalter et al. |
| 8,896,020 B2 | 11/2014 | Schowalter et al. |
| 9,093,402 B2 | 7/2015 | Sakakura et al. |
| 9,418,858 B2 | 8/2016 | Wang et al. |
| 9,496,067 B2 | 11/2016 | Tenne et al. |
| 9,771,666 B2 | 9/2017 | Bondokov et al. |
| 10,294,584 B2 | 5/2019 | Gupta et al. |

(Continued)

FOREIGN PATENT DOCUMENTS

WO     2021202914 A1     10/2021

OTHER PUBLICATIONS

Vishnevetsky, Irina & Epstein, Michael. (2011). Metal Oxides Reduction in Vacuum: Setup Development and First Experimental Results. SolarPACES2011.

(Continued)

*Primary Examiner* — Keling Zhang
(74) *Attorney, Agent, or Firm* — Dinsmore & Shohl LLP

(57) ABSTRACT

A phase change crucible that includes an inner chamber comprising an inner chamber wall extending from an inner chamber floor to an inner chamber upper end, an outer chamber comprising an outer chamber wall extending from an outer chamber floor to an outer chamber upper end, wherein the inner chamber upper end terminates beyond the outer chamber upper end and the outer chamber wall encircles the inner chamber wall, an inner collection region formed by the inner chamber wall and the inner chamber floor, and an outer collection region formed by the outer chamber wall, the inner chamber wall, and the outer chamber floor.

8 Claims, 4 Drawing Sheets

(56) References Cited

U.S. PATENT DOCUMENTS

| | | |
|---|---|---|
| 2007/0218199 A1 | 9/2007 | Bresnahan et al. |
| 2012/0006809 A1 | 1/2012 | Kobyakov et al. |
| 2014/0294700 A1 | 10/2014 | Marx et al. |
| 2018/0221950 A1 | 8/2018 | Mark |

OTHER PUBLICATIONS

International Search Report and Written Opinion for Application No. PCT/US23/28686 mail date Nov. 8, 2023 (7 pages).

PHASE CHANGE SYSTEM AND PHASE CHANGE CRUCIBLE FOR THE SEPARATION OF RARE EARTH ELEMENTS

TECHNOLOGY

The present disclosure is generally related to phase change crucibles. More particularly, the present disclosure is directed to phase change crucibles for the separation of rare earth elements and their purification, for example, by sublimation.

BACKGROUND

Lutiteum-177 (Lu-177) is a radioisotope that is used in the treatment of neuro endocrine tumors, prostate, breast, renal, pancreatic, and other cancers. In the coming years, approximately 70,000 patients per year will need Lu-177 during their medical treatments.

Accordingly, a need exists for improved techniques of separating and purifying radioisotopes, such as Lu-177.

SUMMARY

According to a first aspect of the present disclosure, a phase change crucible includes an inner chamber comprising an inner chamber wall extending from an inner chamber floor to an inner chamber upper end, an outer chamber comprising an outer chamber wall extending from an outer chamber floor to an outer chamber upper end, wherein the inner chamber upper end terminates beyond the outer chamber upper end and the outer chamber wall encircles the inner chamber wall, an inner collection region formed by the inner chamber wall and the inner chamber floor, and an outer collection region formed by the outer chamber wall, the inner chamber wall, and the outer chamber floor.

A second aspect includes the phase change crucible of the first aspect, wherein the inner chamber floor is non-orthogonally angled from the inner chamber wall toward both a centerline of the inner chamber and a lower end the phase change crucible.

A third aspect includes the phase change crucible of the first aspect or the second aspect, wherein the inner chamber floor comprises a floor terminus, a centerline of the inner chamber intersects the floor terminus, and the floor terminus is a location of the inner chamber floor that is farthest in a height direction from the inner chamber upper end.

A fourth aspect includes the phase change crucible of any of the previous aspects, wherein the outer chamber floor is non-orthogonally angled from the inner chamber wall toward both the outer chamber wall and a lower end of the phase change crucible.

A fifth aspect includes the phase change crucible of any of the previous aspects, wherein the outer chamber wall comprises an inner facing surface and the inner chamber wall comprises an outer facing surface, and the inner facing surface of the outer chamber wall is non-parallel with the outer facing surface of the inner chamber wall.

A sixth aspect includes the phase change crucible of any of the previous aspects, wherein the inner chamber and the outer chamber each comprise a refractory metal.

A seventh aspect includes the phase change crucible of any of the previous aspects, further including one or more sensor holes extending into a base of the phase change crucible, wherein the base is disposed between a lower end of the phase change crucible and both the inner chamber floor and the outer chamber floor.

According to an eighth aspect of the present disclosure, a phase change system includes the phase change crucible of any of the previous aspects, a baffle cap removably positioned over the inner chamber floor, wherein the baffle cap comprises one or more openings, and a collection substrate removably positioned such that the baffle cap is between the inner chamber floor and the collection substrate, the collection substrate comprising a collection surface facing the inner chamber of the phase change crucible.

A ninth aspect includes the phase change system of the eighth aspect, wherein the baffle cap is configured to impede a line of sight between the inner chamber floor and the collection substrate and provides a fluid pathway between the inner chamber floor and the collection substrate.

A tenth aspect includes the phase change system of the eighth aspect or the ninth aspect, wherein the baffle cap comprises an interfacing ledge, an extending portion extending from the interfacing ledge, and one or more openings positioned on the extending portion, wherein the interfacing ledge removably positioned on the inner chamber upper end of the phase change crucible.

An eleventh aspect includes the phase change system of any of the eighth through tenth aspects, wherein the collection substrate comprises a material that is chemically non-reactive with ytterbium.

A twelfth aspect includes the phase change system of any of the eighth through eleventh aspects, further including a substrate spacer positioned on a perimeter ledge of the phase change crucible, wherein the perimeter ledge is radially outward the outer chamber wall and the substrate spacer holds the collection substrate above the inner chamber.

According to a thirteenth aspect of the present disclosure, a method of separating rare earth elements includes heating a composition comprising a first element and a second element in an inner chamber of a phase change crucible, wherein heating the composition phase separates the second element from the first element leaving a higher weight percentage of the first element in the inner chamber than was present in the composition and wherein the phase change crucible includes the inner chamber comprising an inner chamber wall extending from an inner chamber floor to an inner chamber upper end, an outer chamber comprising an outer chamber wall extending from an outer chamber floor to an outer chamber upper end, wherein the inner chamber upper end terminates beyond the outer chamber upper end and the outer chamber wall encircles the inner chamber wall, an inner collection region formed by the inner chamber wall and the inner chamber floor, the inner collection region housing the composition, and an outer collection region formed by the outer chamber wall, the inner chamber wall, and the outer chamber floor and the method further includes collecting the second element on a collection substrate positioned above the inner chamber of the phase change crucible.

A fourteenth aspect includes the method of the thirteenth aspect, wherein, the first element comprises a first rare earth element and the second element comprises a second rare earth element.

A fifteenth aspect includes the method of the fourteenth aspect, wherein the first rare earth element comprises lutetium and the second rare earth element comprises ytterbium.

A sixteenth aspect includes the method of any of the thirteenth through fifteenth aspects, wherein a baffle cap is removably positioned on the inner chamber covering the inner chamber floor, wherein the baffle cap comprises one or more openings and the baffle cap is configured to impede a line of sight between the composition disposed in the inner chamber of the phase change crucible and the collection substrate and provides a fluid pathway between the inner chamber floor and the collection substrate.

A seventeenth aspect includes the method of any of the thirteenth through sixteenth aspects, further including collecting a portion of the first element in the outer collection region of the phase change crucible.

An eighteenth aspect includes the method of any of the thirteenth through seventeenth aspects, wherein heating the composition comprises inductively heating the composition.

A nineteenth aspect includes the method of any of the thirteenth through eighteenth aspects, wherein heating the composition comprises retaining a temperature of the composition in a temperature range of from 400° C. to 2000° C. to leave a first element composition comprising a higher weight percentage of the first element than was present in the composition.

A twentieth aspect includes the method of any of the thirteenth through nineteenth aspects, wherein when heating the composition, the phase change crucible is positioned in an inert or reduced pressure environment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
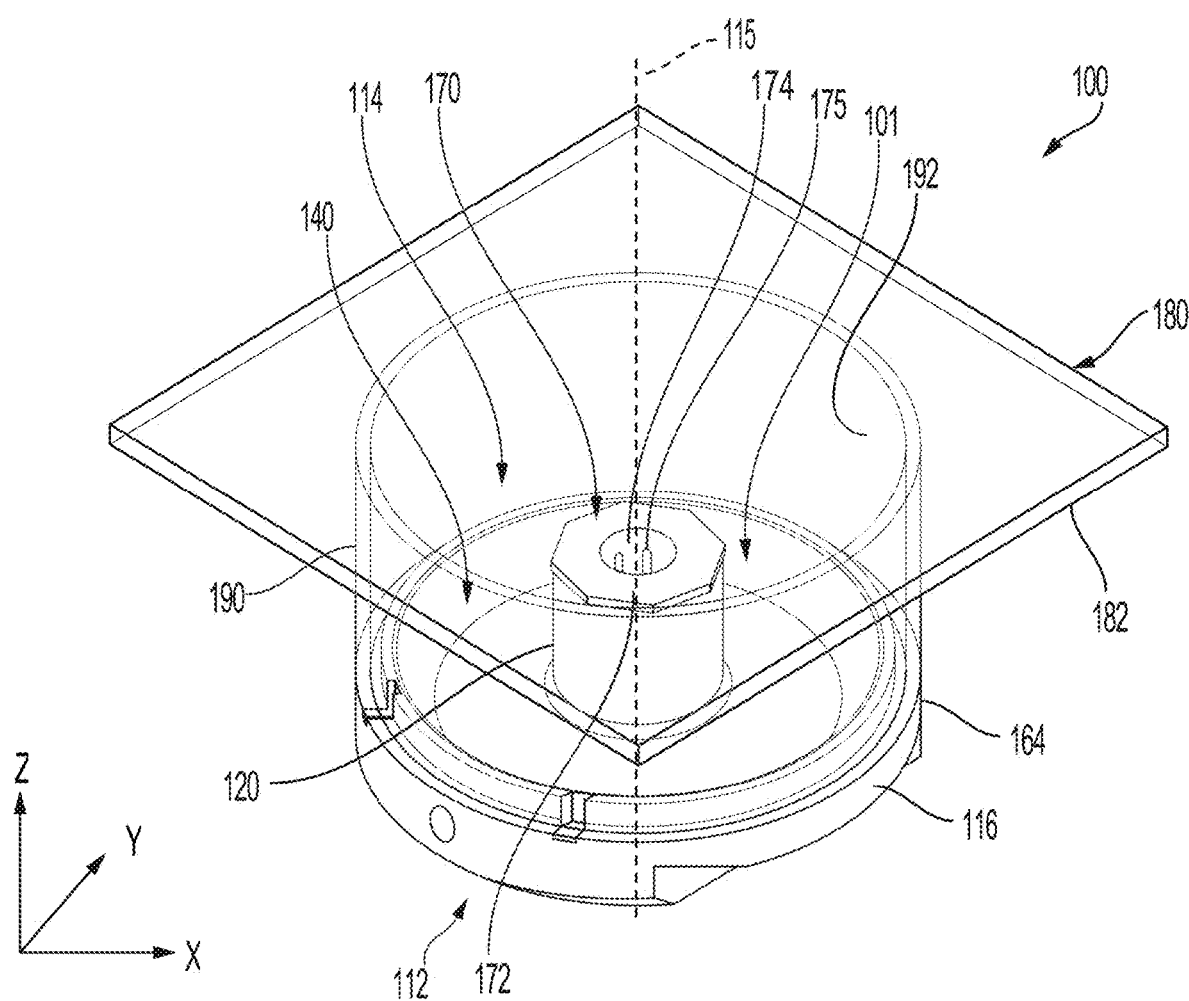
FIG. 1 schematically depicts an isometric view of a phase change system that includes a phase change crucible, a collection substrate, a substrate spacer, and a baffle cap, according to one or more embodiments shown and described herein.

Referring generally to the figures, embodiments of the present disclosure are directed to a phase change system including a phase change crucible designed for the separation of rare earth elements, for example, the separation of ytterbium from a composition that comprises ytterbium and lutetium, by sublimation, distillation, or a combination thereof. The phase change crucible comprises a multi chamber design with an inner chamber surrounded by an outer chamber, that is configured to support separation of a second element (such as ytterbium) from a composition comprising a first element (such as lutetium) and the second element and collection of both the first element and the second element with minimal loss of either. For example, this separation may occur by sublimating or distilling the second element from the composition and collecting both the sublimated second element and a remaining first element. The remaining first element may compromise high purity isotopes of lutetium, such as lutetium-177 (Lu-177) separated from a composition comprising ytterbium and lutetium. In such operations, the dual chamber design of the phase change crucible minimizes loss of both lutetium and ytterbium (in both their separated compositional form and a combined compositional form) during the separation process, which are rare and expensive elements. This allows the lutetium and ytterbium to be reprocessed with minimal loss, and used to collect additional high purity lutetium, such as additional Lu-177.

Lu-177 is used in the treatment of neuro endocrine tumors, prostate, breast, renal, pancreatic, and other cancers. In the coming years, approximately 70,000 patients per year will need no carrier added Lu-177 during their medical treatments. Lu-177 is useful for many medical applications, because during decay it emits a low energy beta particle that is suitable for treating tumors. It also emits two gamma rays that can be used for diagnostic testing. Isotopes with both treatment and diagnostic characteristics are termed "theranostic." Not only is Lu-177 theranostic, but it also has a 6.65-day half-life, which allows for more complicated chemistries to be employed, as well as allowing for easy global distribution. Lu-177 also exhibits chemical properties that allow for binding to many bio molecules, for use in a wide variety of medical treatments.

There are two main production pathways to produce Lu-177. One is via a neutron capture reaction on Lu-176; Lu-176 (n,γ) Lu-177. This production method is referred to as carrier added (ca) Lu-177. A carrier is an isotope(s) of the same element (Lu-176 in this case), or similar element, in the same chemical form as the isotope of interest. In microchemistry the chemical element or isotope of interest does not chemically behave as expected due to extremely low concentrations. Moreover, isotopes of the same element cannot be chemically separated, and require mass separation techniques. The carrier method, therefore, results in the produced Lu-177 having limited medical application.

The second production method for Lu-177 is a neutron capture reaction on ytterbium-176 (Yb-176) (Yb-176(n,γ) Yb-177) to produce Yb-177. Yb-177 then rapidly ($t_{1/2}$ of 1.911 hours) beta-decays into Lu-177. An impurity of Yb-174 is typically present in the Yb-176, leading to a further impurity of Lu-175 in the final product. This process is considered a "no carrier added" process. The process may be carried out as ytterbium metal or ytterbium oxide. The phase change system described herein which may be used for the separation of ytterbium and lutetium obtained from a no carrier added process. While the phase change system is primarily described herein in relation to the separation of ytterbium and lutetium, it should be understood that the phase change system may be used to facilitate separation of a variety of elements, for example any of the rare earth, and/or actinide metals where there is a difference in boiling/sublimation point, such as cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

Referring now to FIG. 1, a phase change system 100 comprising a phase change crucible 101, a baffle cap 170, and a collection substrate 180 is schematically depicted. The phase change system 100 is configured to support separation of a second element from a composition comprising a first element and the second element. For example, the phase change crucible 101 may house and heat the composition, such that the second element separates from the composition by sublimation or distillation and collects on a collection surface 182 of the collection substrate 180. The phase change crucible 101 comprises an outer chamber 140 that surrounds (e.g., encircles) an inner chamber 120, an outer surface 116 radially outward both the inner chamber 120 and the outer chamber 140, and an upper end 114 opposite a lower end 112. The collection substrate 180 is spaced apart from the inner chamber 120 and the outer chamber 140 of the phase change crucible 101 (in the Z-direction) by a substrate spacer 190. A collection surface 182 of the collection substrate 180 faces the inner chamber 120 and the outer chamber 140. In some embodiments, at least the collection surface 182 of the collection substrate 180 comprises a material that is chemically non-reactive with the element to be collected (e.g., the second element, which may comprise ytterbium) and is thermally conductive such that the collection substrate 180 may be actively cooled. Example materials for the collection substrate 180 include steel, boron nitride, titanium nitride, quartz, glass, and ceramic, however, it should be understood that any material that is chemically non-reactive with the second element may be used.

Figure 2:
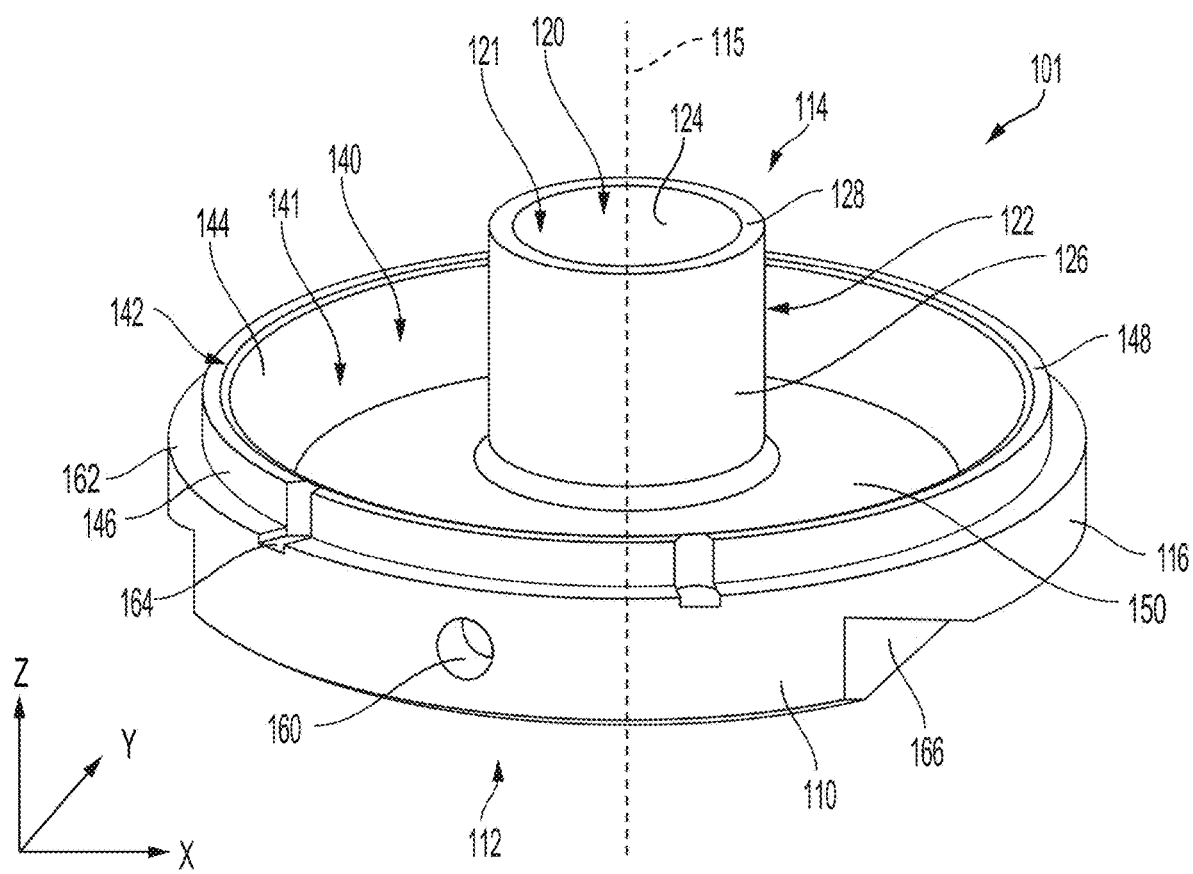
FIG. 2 schematically depicts an isometric view of the phase change crucible of FIG. 2, according to one or more embodiments shown and described herein.
Figure 3:
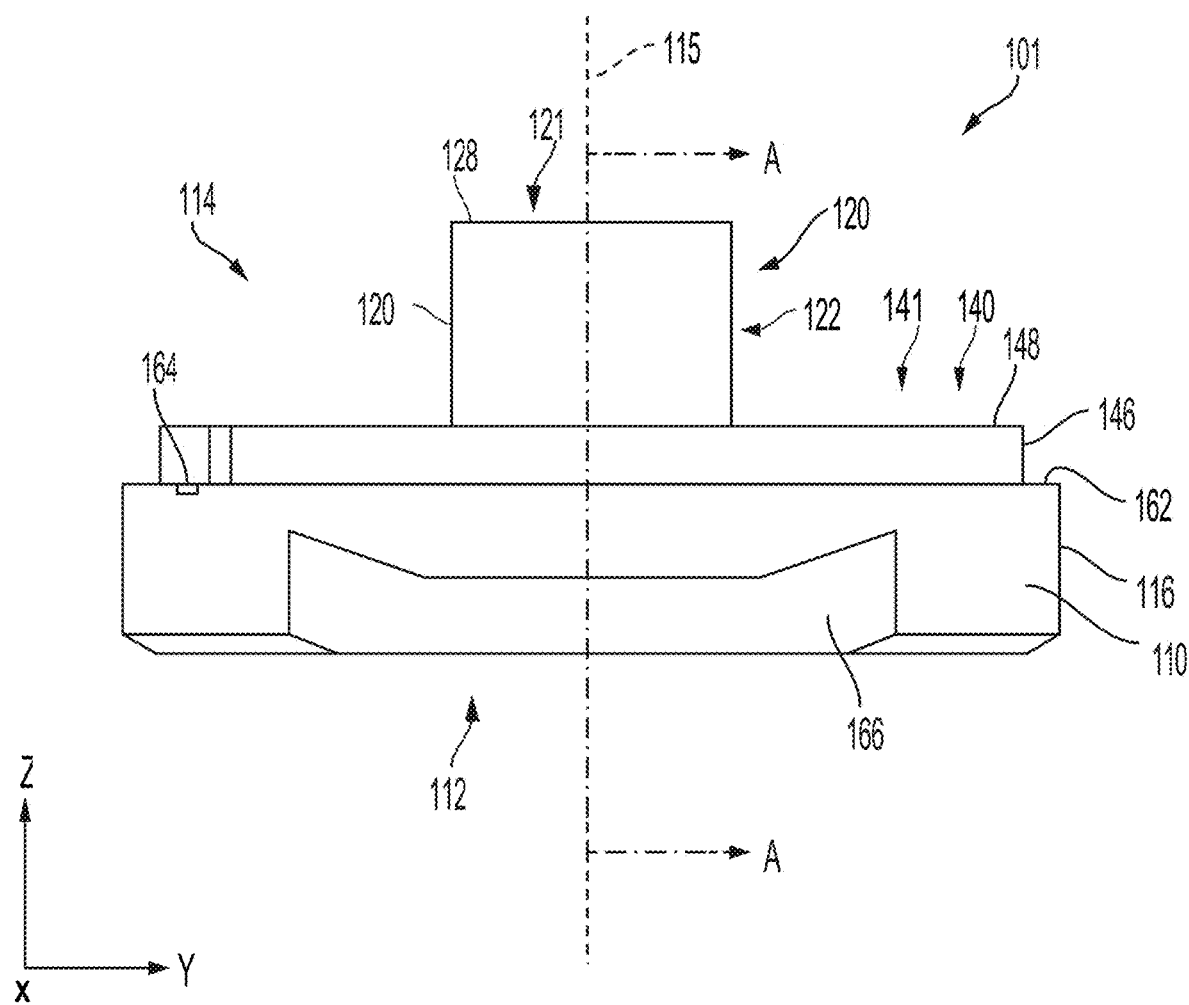
FIG. 3 schematically depicts a side view of the phase change crucible of FIG. 2, according to one or more embodiments shown and described herein.
Figure 4:
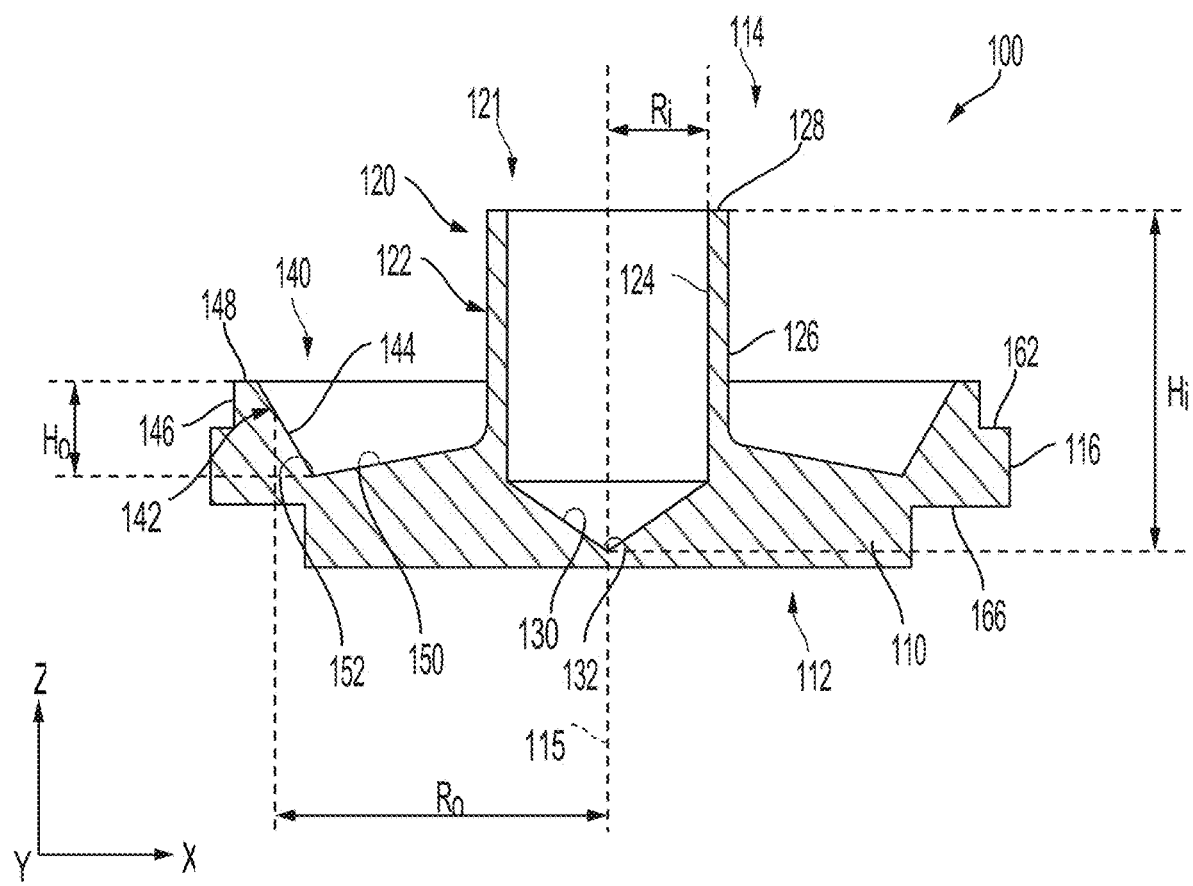
FIG. 4 schematically depicts a sectional view of the phase change crucible of FIG. 3, taken along line A-A, according to one or more embodiments shown and described herein.

Referring also to FIGS. 2-4, the inner chamber 120 of the phase change crucible 101 includes an inner chamber wall 122 extending from an inner chamber floor 130 to an inner chamber upper end 128. The inner chamber wall 122 comprises an inner facing surface 124 and an outer facing surface 126. The inner chamber upper end 128 of the inner chamber wall 122 is located at the upper end 114 of the phase change crucible 101 and forms a top surface of the inner chamber 120 (e.g., the furthermost extent of the inner chamber 120 in the +Z direction of the coordinate axes of FIGS. 1-4). The outer chamber 140 includes an outer chamber wall 142 extending from an outer chamber floor 150 to an outer chamber upper end 148. The outer chamber wall 142 comprises an inner facing surface 144 and an outer facing surface 146. The outer chamber upper end 148 is located at the upper end 114 of the phase change crucible 101 and forms a top surface of the outer chamber 140 (e.g., the furthermost extent of the inner chamber 120 in the +Z direction of the coordinate axes of FIGS. 1-4).

The outer chamber wall 142 encircles the inner chamber wall 122. The phase change crucible 101 comprises a centerline 115 along the Z axis depicted in FIGS. 1-4. In some embodiments, the inner chamber 120 and the outer chamber 140 are concentric, such that the centerline 115 is the centerline of both the inner chamber 120 and the outer chamber 140. In some embodiments, the inner chamber 120 and the outer chamber 140 each comprise a circular cylindrical shape. In other embodiments, the inner chamber 120 and the outer chamber 140 may each comprise an elliptical cylindrical shape, or a polygonal shape. The inner chamber 120 and the outer chamber 140 each comprise a refractory metal. Example refractory metals include tungsten, molybdenum, niobium, tantalum, and rhenium. Indeed, in some embodiments, the phase change crucible 101 is a monolithic structure comprising a refractory metal. However, other embodiments are contemplated in which the phase change crucible 101 is formed by multiple coupled components.

The inner chamber wall 122 comprises a height $H_i$ extending from a floor terminus 132 of the inner chamber floor 130 to the inner chamber upper end 128 and the outer chamber wall 142 comprises a height $H_o$ extending from a floor terminus 152 of the outer chamber floor 150 to the outer chamber upper end 148. The inner chamber 120 is taller than the outer chamber 140. That is, the height $H_i$ is greater than the height $H_o$ and the gap between the collection substrate 180 and the inner chamber wall 122 is less than the gap between the collection substrate 180 and the outer chamber wall 142. Thus, the inner chamber 120 directs the second element (e.g., Yb vapor) onto the collection surface 182 of the collection substrate 180 while minimizing the amount of the second element that collects on the substrate spacer 190 and minimizing heat transfer from the outer chamber wall 142 to the collection substrate 180. Indeed, as shown in FIG. 1, physical contact between the collection substrate 180 and the phase change crucible 101 occurs at the outer chamber wall 142 via the substrate spacer 190 (which contacts the outer facing surface 146) and not at the inner chamber wall 122. Thus, when inductively heated, heat transfer from the phase change crucible 101 to the collection substrate 180 emanates from the outer chamber wall 142 along the substrate spacer 190 and is reduced by increasing the distance between the outer chamber wall 142 and the collection substrate 180.

The inner chamber 120 comprises a radius $R_i$ extending from the centerline 115 to an inner facing surface 124 of the inner chamber wall 122. In some embodiments, the radius $R_i$ is constant along the height $H_i$ of the inner chamber 120—that is, the inner facing surface 124 of inner chamber wall 122 is parallel to the centerline 115. The radius $R_i$ is sized to hold a desired amount of the composition comprising the first element and the second element. It should be understood that the phase change crucible 101 may be designed with a range of radii $R_i$ to facilitate a variety of separation operations. The outer chamber 140 comprises a radius $R_o$ extending from the centerline 115 to an inner facing surface 144 of the outer chamber wall 142. In some embodiments, the radius $R_o$ is variable along the height $H_i$ of the outer chamber 140. For example, the $R_o$ at the interface of the outer chamber floor 150 and the inner facing surface 144 is less than the $R_o$ at the interface of the outer chamber upper end 148 and the inner facing surface 144.

Referring still to FIGS. 1-4, an inner collection region 121 is formed by the inner chamber wall 122 and the inner chamber floor 130. In operation, the inner collection region 121 holds a composition comprising at least the first element and the second element during a separation process and retains the first element during the separation process. An outer collection region 141 formed by the outer chamber wall 142, the inner chamber wall 122, and the outer chamber floor 150. The outer collection region 141 provides a location for the collection of any of the first element of the composition that exits the inner collection region 121 during the separation process, for example, any of the first element that is ejected from the inner chamber 120 during the separation process. For example, the outer collection region 141 may provide a secondary location for particulates that contain the first element (e.g., an ejected composition) to collect.

During the separation process, most of the first element (e.g., lutetium) is retained in the inner collection region 121, but some ash flakes that are rich in first element content (e.g., lutetium content) may drift upward and exit the inner collection region 121, not condense on the collection surface 182 of the collection substrate 180, and instead collect in the outer collection region 141. These ash flakes (e.g., the ejection composition) contain the first element, which may still be combined with the second element, for example, at higher levels than retained within the inner collection region 121 after the separation process and lower levels that present in the initial composition. This intermediate composition (e.g., the ejection composition) may be collected for additional processing. In some embodiments, the ejection composition may undergo an additional process to separate the first element of the ejection composition from the second element. In other embodiments, the ejection composition may be combined with the first element retained in the inner collection region 121 and such combination may then be further purified to obtain a desired isotope, such as Lu-177. Combining the ejection composition with the retained first element may increase the overall yield of Lu-177.

One or more sensor holes 160 extend radially into the base 110 of the phase change crucible 101, between the lower end 112 and both the inner chamber floor 130 and the outer chamber floor 150. The one or more sensor holes 160 provide a location for a sensor probe, such as a temperature probe, to be inserted into the one or more sensor holes 160 to measure the temperature of the phase change crucible 101 and thus measure the temperature applied to a composition located in the inner chamber 120 of the phase change crucible 101. In some embodiments, at least one of the one or more sensor holes 160 extends toward the centerline 115 and may intersect the centerline 115. This facilitates positioning of a sensor probe in alignment with the floor terminus 132 of the inner chamber 120 along the Z axis.

The phase change crucible 101 includes a perimeter ledge 162 disposed radially outward the outer chamber wall 142. The perimeter ledge 162, together with the outer facing surface 146 of the outer chamber wall 142, provide a location for seating the substrate spacer 190 on the phase change crucible 101. The substrate spacer 190 provides a structure for holding the collection substrate 180 and an inner surface 192 of the substrate spacer 190 provides a secondary collection location during the separation process. Indeed, like the collection substrate 180, at least the inner surface 192 of the substrate spacer 190 comprises a material that is chemically non-reactive with the element to be collected (e.g., the second element, which may comprise ytterbium). Example materials for the substrate spacer 190 include steel, boron nitride, titanium nitride, quartz, glass, and ceramic, however, it should be understood that any material that is chemically non-reactive with the element to be collected may be used.

In some embodiments, one or more perimeter notches 164 extend into the perimeter ledge 162 to enhance measurement of the gas composition of the phase change system 100 and allow process control. The one or more perimeter notches 164 may also be used for temperature measurement instrumentation to enter the inner chamber 120 and the outer chamber 140 to allow for process control. The phase change crucible 101 may further comprise one or more holder notches 166 extending into the base 110 from both the lower end 112 and the outer surface 116 of the phase change crucible 101. The one or more holder notches 166 facilitate mechanical positioning and selective coupling of the phase change crucible 101 and an external component, such as a mechanical insertion and removal device or vertical stepper motor, while impeding rotation motion of the phase change crucible 101 with respect to the external component. Indeed, in some embodiments the phase change crucible 101 is heated by induction heating and the one or more holder notches 166 facilitate stable positioning of the phase change crucible 101.

Referring now to FIG. 4, in some embodiments, the inner chamber floor 130 is non-orthogonally angled from the inner chamber wall 122 toward both the centerline 115 of the inner chamber 120 and the lower end 112 the phase change crucible 101. For example, the inner chamber floor 130 may comprise a floor terminus 132, which is a location of the inner chamber floor 130 that is farthest in a height direction (i.e., a Z direction) from the inner chamber upper end 128. In some embodiments, the centerline 115 intersects the floor terminus 132. That is, the floor terminus 132 is at the center of the inner chamber 120. The floor terminus 132 positions a composition held in the inner chamber 120 near a heat source, which may be located at the lower end 112 of the phase change crucible 101 or between the lower end 112 and the inner chamber floor 130. In operation, after separation of the first element and the second element, the second element may be dissolved in a liquid and the floor terminus 132 also reduces the difficulty of extracting the dissolved second element from the inner chamber 120.

As also depicted in FIG. 4, in some embodiments the outer chamber floor 150 is non-orthogonally angled from the inner chamber wall 122 toward both the outer chamber wall 142 and the lower end 112 of the phase change crucible 101. For example, the outer chamber floor 150 may comprise a floor terminus 152, which is a location of the inner chamber floor 130 that is farthest in a height direction (i.e., a Z direction) from the inner chamber upper end 128. The floor terminus 152 forms a ring along the outer chamber floor 150, encircling the inner chamber 120. In operation, the floor terminus 152 provides a location for the ejected composition (which includes the first element to settle for collection and further processing. In some embodiments, the outer chamber wall 142 extends from the outer chamber floor 150 at the floor terminus 152 and the inner facing surface 144 of the outer chamber wall 142 is non-parallel with the outer facing surface 126 of the inner chamber wall 122, creating an obtuse angle to allow for easier inspection and removal of any collected material (e.g., the ejected composition).

Referring again to FIG. 1, the baffle cap 170 may be removably positioned over the inner chamber floor 130 of the inner chamber 120 such that the baffle cap 170 is between the inner chamber floor 130 and the collection surface 182 of collection substrate 180. The baffle cap 170 comprises an interfacing ledge 172 and an extending portion 174 extending from the interfacing ledge 172, for example, extending orthogonally from the interfacing ledge 172. The interfacing ledge 172 provides a surface for interfacing the baffle cap 170 with the inner chamber 120 of the phase change crucible 101 to position the baffle cap 170 over the inner chamber floor 130. For example, the interfacing ledge 172 may contact the inner chamber upper end 128. In some embodiments, as depicted in FIG. 1, the extending portion 174 extends into the inner chamber 120 when the interfacing ledge 172 contacts the inner chamber upper end 128. In other embodiments, the extending portion 174 may extend away from the inner chamber 120 when the interfacing ledge 172 contacts the inner chamber upper end 128.

Referring still to FIG. 1, the baffle cap 170 comprises one or more openings 175 that fluidly connect the inner chamber floor 130 of the inner chamber 120 and the collection surface 182 of the collection substrate 180. For example, when separated from the composition into a gaseous form, the second element may traverse the one or more openings 175, exit the inner chamber 120, and reach the collection surface 182 of the collection substrate 180. The baffle cap 170 is configured to impede a line of sight between the inner chamber floor 130 and the collection substrate 180. In other words, the openings 175 of the baffle cap 170 are positioned such that a direct line of sight from the inner chamber floor 130 (or a composition positioned on the inner chamber floor 130) to the collection substrate 180 would not pass through any of the openings 175. Impeding the line of sight between the inner chamber floor 130 and the collection substrate 180 minimizes the ability of a solid or liquid phase of the first element or the second element to exit the inner chamber 120 while retaining a pathway for gas (e.g., the gaseous phase of the second element) to exit the inner chamber 120. This reduced the amount of ejected composition that reaches the outer collection region 141. Impeding the line of sight between the inner chamber floor 130 and the collection substrate 180 also improves the uniformity of the thermal profile in the inner chamber 120 by reducing the line-of-sight exposure to the colder collection surface 182 (e.g., deposition surface). One embodiment for impeding this line of sight while providing a fluid pathway is shown in the baffle cap 170 of FIG. 1, in which the one or more openings 175 are positioned on the extending portion 174 of the baffle cap 170. The one or more openings 175 may comprise an elongated shape (e.g., elongated along the Z-axis in FIG. 1). Moreover, the width (e.g., radius) of the extending portion 174 is such that a gap (e.g., a radial gap) is formed between the inner facing surface 124 of the inner chamber wall 122 of the inner chamber 120 when the extending portion 174 is located in the inner chamber 120. This gap facilitates the flow of gas through the one or more openings 175 and out of the inner chamber 120.

Referring again to FIGS. 1-4, the phase change system 100 may be used to separate elements, such as a first element (e.g., a first rare earth element) and a second element (e.g., a second rare earth element). During the separation process the phase change system 100 may be located in a chamber having gas, cooling, vacuum, power, and instrument feedthroughs. The separation process includes heating a composition (e.g., a solid composition) comprising the first element and the second element in the inner chamber 120 of the phase change crucible 101. Heating the composition comprises retaining a temperature of the composition in a temperature range of from 400° C. to 2000° C., for example, from 450° C. to 1500° C., from 450° C. to 1200° C., from 450° C. to 1000° C., from 400° C. to 1000° C., from 400° C. to 900° C., from 400° C. to 800° C., from 450° C. to 700° C., from 400° C. to less than 700° C., from 400° C. to 695° C., from 450° C. to 690° C., from 450° C. to 685° C., from 450° C. to 680° C., from 450° C. to 675° C., from 450° C. to 670° C., from 450° C. to 665° C., from 450° C. to 660° C., from 450° C. to 655° C., from 450° C. to 650° C., from 450° C. to 645° C., from 450° C. to 640° C., from 450° C. to 635° C., from 450° C. to 630° C., from 450° C. to 625° C., 470° C. to about 630° C., from 800° C. to 2000° C., from greater than 800° C. to 2000° C., from 1000° C. to 2000° C., from 1200° C. to 2000° C., from 1500° C. to 2000° C., or any range having any two of these values as endpoints. Indeed, the temperature for sublimation and/or distillation (e.g., the temperature in the environment) may be 400° C., 425° C., 450° C., 470° C., 475° C., 500° C., 525° C., 550° C., 575° C., 600° C., 625° C., 640° C., 650° C., 655° C., 660° C., 665° C., 670° C., 675° C., 680° C., 685° C., 690° C., 695° C., 698° C., 700° C., 725° C., 750° C., 775° C., 800° C., 850° C., 900° C., 950° C., 1000° C., 1100° C., 1200° C., 1300° C., 1400° C., 1500° C., 1600° C., 1700° C., 1800° C., 1900° C., 2000° C., any range having any two of these values as endpoints, or any value in a range having any two of these values as endpoints.

In some embodiments, heating the composition comprises inductively heating the composition. For example, the phase change crucible 101 may be an inductive heating crucible and heat may be inductively applied to the composition by inductively heating the phase change crucible 101 using an inductive heating source. The inductive heating source may be coupled to the lower end 112 of the phase change crucible 101, for example, using the one or more holder notches 166 to reproducibly position the phase change crucible 101. In such embodiments, the material of the phase change crucible is electrically and thermally conductive to facilitate inductive heating, such as a refractory metal material.

Moreover, in some embodiments, when heating the composition, the phase change system 100 may be positioned in an inert or reduced pressure environment. For example, the phase change system 100 may be positioned in chamber that forms an inert or reduced pressure environment. The inert or reduced pressure environment may be an environment with a pressure in a range of from 2000 torr to $1 \times 10^{-8}$, from 1520 torr to $1 \times 10^{-8}$ torr, from 1000 torr to $1 \times 10^{-8}$ torr, from 760 torr to $1 \times 10^{-8}$ torr, from 700 torr to $1 \times 10^{-8}$ torr, from 500 torr to $1 \times 10^{-8}$ torr, from 250 torr to $1 \times 10^{-7}$ torr, from 100 torr to $1 \times 10^{-6}$ torr, from 1 torr to $1 \times 10^{-6}$ torr, from $1 \times 10^{-1}$ torr to $1 \times 10^{-6}$ torr, $1 \times 10^{-3}$ or less, $1 \times 10^{-5}$ torr or less, $1 \times 10^{-6}$ torr or less, from 2000 torr to $1 \times 10^{-1}$ torr, from 1520 torr to 1 torr, from 1000 torr to 1 torr, from 760 torr to 1 torr, from 760 torr to 250 torr, any range having any two of these values as endpoints, or any value in a range having any two of these values as endpoints.

In some embodiments, the first element of the composition is a first rare earth element, such as lutetium, and the second element of the composition is a second rare earth element, such as ytterbium. Heating the composition phase separates the second element from the first element to leave a higher weight percentage of the first element in the inner chamber 120 than was present in the composition. For example, the phase separation may occur by distillation, sublimation, or a combination thereof. In sublimation, the solid phase of an element (e.g., the second element) is converted directly to the gas phase via heating, and the gas phase can then be collected for later use. In distillation, an element (e.g., the second element) is heated to its boiling point (going through the liquid phase) and vaporized off. The vaporized fraction can then be recovered downstream after the vapor is condensed. Indeed, in the embodiments described herein, the boiling point of the first element is higher than the boiling point of the second element and the sublimation point of the first element is higher than the sublimation point of the second element.

The separation process further comprises collecting the second element on the collection substrate 180, for example, the collection surface 182 of the collection substrate 180. The collection substrate 180 is positioned above the inner chamber 120 such that a gaseous form of the second element flows from the inner chamber 120 to the collection surface 182. At the collection surface 182, the second element may solidify and stick to the collection surface 182 by condensation. In some embodiments, the collection substrate 180 may be actively cooled, for example, by a cooling fluid, to promote solidification of the second element onto the collection surface 182. In the case in which lutetium is the first element and ytterbium is the second element, the ytterbium is vaporized (and collected by the phase change system 100 for later use) leaving behind a material that is enriched in lutetium. The ytterbium that is collected is available for recycling to a reactor, particle accelerator, or other neutron generating source, to produce further lutetium in subsequent runs of the process, for example, subsequent runs of the separation process performed using the phase change system 100. Moreover, the separation process further comprising collecting the ejected composition in the outer collection region 141. As described above, the ejected composition includes the first element and may still be combined with the second element, for example, at higher levels than retained within the inner collection region 121 The ejection composition may be collected for additional processing.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical values or idealized geometric forms provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, optical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of separating rare earth elements, the method comprising
    heating a composition comprising a first element and a second element in an inner chamber of a phase change crucible, wherein heating the composition phase separates the second element from the first element leaving a higher weight percentage of the first element in the inner chamber than was present in the composition and wherein the phase change crucible comprises:
        the inner chamber comprising an inner chamber wall extending from an inner chamber floor to an inner chamber upper end;
        an outer chamber comprising an outer chamber wall extending from an outer chamber floor to an outer chamber upper end, wherein the inner chamber upper end terminates beyond the outer chamber upper end and the outer chamber wall encircles the inner chamber wall;
        an inner collection region formed by the inner chamber wall and the inner chamber floor, the inner collection region housing the composition; and
        an outer collection region formed by the outer chamber wall, the inner chamber wall, and the outer chamber floor; and
    collecting the second element on a collection substrate positioned above the inner chamber of the phase change crucible.

2. The method of claim 1, wherein the first element comprises a first rare earth element and the second element comprises a second rare earth element.

3. The method of claim 2, wherein the first rare earth element comprises lutetium and the second rare earth element comprises ytterbium.

4. The method of claim 1, wherein a baffle cap is removably positioned on the inner chamber covering the inner chamber floor, wherein the baffle cap comprises one or more openings and the baffle cap is configured to impede a line of sight between the composition disposed in the inner chamber of the phase change crucible and the collection substrate and provides a fluid pathway between the inner chamber floor and the collection substrate.

5. The method of claim 1, further comprising collecting a portion of the first element in the outer collection region of the phase change crucible.

6. The method of claim 1, wherein heating the composition comprises inductively heating the composition.

7. The method of claim 1, wherein heating the composition comprises retaining a temperature of the composition in a temperature range of from 400° C. to 2000° C. to leave a first element composition comprising a higher weight percentage of the first element than was present in the composition.

8. The method of claim 1, wherein when heating the composition, the phase change crucible is positioned in an inert or reduced pressure environment.

* * * * *